Patented July 29, 1924.

1,502,956

UNITED STATES PATENT OFFICE.

PAUL R. JONES, OF PORTERVILLE, CALIFORNIA, ASSIGNOR TO BALFOUR, GUTHRIE & COMPANY, OF SAN FRANCISCO, CALIFORNIA, A COPARTNERSHIP.

INSECTICIDE.

No Drawing.  Application filed April 27, 1921. Serial No. 465,012.

*To all whom it may concern:*

Be it known that I, PAUL R. JONES, a citizen of the United States, residing at Porterville, in the county of Tulare and State of California, have invented new and useful Improvements in Insecticides, of which the following is a specification.

This invention relates to an insecticide material and particularly pertains to a mineral oil soap.

At the present time it is common practice to produce insecticide solutions from various ingredients, the most important of which have been vegetable and animal oil soaps in combination with cresylic acid. Numerous disadvantages have attended the use of such solutions as sprays for vegetation, due to the fact that the miscible oils and the acid break down producing insoluble calcium and magnesium oleates, commonly known as lime and magnesium soaps, and which soaps are in the form of curds acting to clog the spray, and at the same time break down the ingredients of the solution so that the foliage of the plant life is often injured, and an attendant poor penetration of scale obtained, this being especially true when the miscible oils and soaps are mixed with hard water. It is the principal object of the present invention, therefore, to provide a miscible oil which will not combine with the acids of the solution to form calcium or magnesium oleates and thereby insuring that no breaking down of the solution will take place, and that a maximum lasting penetration of the scale will be obtained.

The present invention contemplates the use of mineral oil derivatives, such as sodium naphthenates produced during the process of refining hydrocarbon oils apparently a combination of sodium or lye with acids of the naphthenic series, which occur in California petroleum and some Russian oils. A soap is formed chiefly composed of the sodium naphthenates, it being of high specific gravity, very viscous of bluish purple color, and readily diluting with water.

This mineral soap is made from the wash water of certain lubricating oils, after these oils have been neutralized with caustic soda to remove the sulfuric acid with which the oil has been previously treated. This procedure usually consists in treating pale oil or light automobile lubricating oil of approximately 200 viscosity with sulfuric acid. The acid tar or sludge is thereafter allowed to settle and the oil then neutralized with caustic soda. The washing of the oil with caustic soda produces a by-product in the form of wash waters which are saved. The caustic soda content of these waters combines with the acids of the naphthenic series to form sodium naphthenates. The wash waters may then be treated with sulfuric acid, thus causing the sodium naphthenates in the wash water to rise to the top of the solution, after which the water may be drawn off. The naphthenates are then further neutralized with caustic soda to eliminate the free sulfuric acid, after which steam is blown through the mass until the remaining product is clear and practically free from water. Another method of securing sodium naphthenates from wash water of the character described is to use a strong salt solution to separate the naphthenates from the water, these being then drawn off and blown with steam until it is clear, heavy, viscous sodium naphthenate soap.

The product thus obtained is a mineral oil soap which is exceedingly valuable in the manufacture of oil emulsions or miscible oil insecticides. The mineral oil soap may be used to produce a tank spray by combining it with crude oil, kerosene, or light lubricating oils in the proportions of one part of the soap to two to four parts of oil, with a small amount of water added, thus producing an emulsifying product which may be used as a spray. The mineral oil soap may also be made into a cresol soap where it will replace the vegetable or animal oils which are being used at the present time in the manufacture of such soaps, a preferable formula for making 843 gallons of mineral oil cresol soap is:

540 gal. mineral oil soap in the form of sodium naphthenate.

125 gal. of caustic potash water running 23° Baumé.

760# of ground resin.

100 gals. of high grade cresylic acid of at least 95% phenol content.

50 gal. of water added to the mixture before it is taken from the kettle for evaporation.

This mineral oil cresol soap is then used with various oils such as kerosene, crude oil or light lubricating oil for the manufacture of miscible oils as follows:

Mineral oil cresol soap, 1 part.
Oil, 3, 4 or 5 parts.

The proportion of oil will depend upon the nature of the oil used and the degree of concentration of the miscible product obtained. It is also necessary to add small amounts of water to the mixture of soap and oil which will depend upon the concentration of the miscible oil and the proportions of the parts of soap and oil. As for example, the smaller the amount of mineral cresol soap used in proportion to the amount of oil with which it is mixed, the more water is required to be added to insure that the resulting miscible oil will remain of uniform concentration and will be a stable product.

Another form of tank spray may be produced by mixing equal parts of mineral oil cresol soap with equal parts of the ordinary cresol soaps containing vegetable and animal oils. This combination soap is then mixed with mineral oil in the proportions of 1, 2, 3, 4, or 5, after which the mixture is diluted with water to make a uniform smooth emulsion ready for use in the tank. The ordinary cresol soap referred to above is usually made as follows:

750# of resin.
125 gal. of high grade cresylic acid of at least 95% phenol content.
102 gal. #2, 3, or 4 whale oil.
150 gal. of caustic potash water 23° Baumé.
50 gal. water added just before the product is removed from the kettle.

By the use of mineral oil soaps alone or in combination with other soaps when mixed with mineral oil it has been demonstrated that a superior insecticide spray is produced which will form a permanent emulsion with hard water without breaking down or forming curd soaps in the spray tank, as commonly occurs when mineral or vegetable oil soaps are used either by themselves or in combination with cresylic acid and it has been further proven that the emulsion possesses greater penetrating qualities than heretofore obtained with less injury to the foliage of the vegetation.

Having thus described my invention, what I claim and desire to secure by Letters Patent is:

1. As a composition of matter, an insecticide comprising sodium naphthenate and a liquid vehicle therefor.

2. An insecticide soap solution comprising sodium naphthenate, caustic alkali, resin and cresylic acid.

3. An insecticide solution comprising a hydrocarbon oil and sodium naphthenate soap mixed therewith.

4. An insecticide emulsion comprising in combination sodium naphthenates, a vehicle of light grade oil and water.

5. An insecticide emulsion comprising sodium naphthenates, cresol soap, a vehicle of mineral oil and an additional quantity of water sufficient to produce a smooth emulsion.

6. A non-curding miscible oil insecticide, comprising mineral oil, to which is added a mineral oil soap composed chiefly of sodium naphthenates and water.

PAUL R. JONES.